(12) United States Patent
Young

(10) Patent No.: US 8,418,978 B2
(45) Date of Patent: Apr. 16, 2013

(54) POLE-MOUNTED ELECTRONICS CHASSIS

(75) Inventor: Steven William Young, Phoenix, AZ (US)

(73) Assignee: Atlas Sound LP, Ennis, TX (US)

( * ) Notice: Subject to any disclaimer, the term of this patent is extended or adjusted under 35 U.S.C. 154(b) by 0 days.

(21) Appl. No.: 11/759,174

(22) Filed: Jun. 6, 2007

(65) Prior Publication Data

US 2007/0287331 A1 Dec. 13, 2007

Related U.S. Application Data

(60) Provisional application No. 60/804,436, filed on Jun. 10, 2006.

(51) Int. Cl.
*A47H 1/10* (2006.01)

(52) U.S. Cl.
USPC .................. 248/317; 248/219.1; 220/475

(58) Field of Classification Search .................. 361/679; 248/218.4, 219.3, 317, 219.4, 219.1, 219.2, 248/324, 343, 327, 323, 551, 553, 552; 220/475
See application file for complete search history.

(56) References Cited

U.S. PATENT DOCUMENTS

| | | | | |
|---|---|---|---|---|
| 2,318,122 A * | 5/1943 | Cortlandt | ...................... | 220/475 |
| 2,943,137 A * | 6/1960 | Van Wyngarden | .............. | 174/61 |
| 3,430,799 A * | 3/1969 | Maier | .......................... | 220/3.94 |
| 3,920,295 A * | 11/1975 | Speckin | ......................... | 312/108 |
| 4,021,792 A * | 5/1977 | Ludt et al. | ...................... | 340/630 |
| 4,525,077 A | 6/1985 | Ketner | | |
| 4,539,497 A | 9/1985 | Boyer | | |
| 4,623,878 A * | 11/1986 | Schoenwetter | ............... | 340/628 |
| 4,725,837 A | 2/1988 | Rubin | | |
| 4,805,075 A * | 2/1989 | Damore | ......................... | 362/123 |
| 4,964,606 A * | 10/1990 | Beam et al. | .................... | 248/333 |
| 5,359,324 A | 10/1994 | Clark et al. | | |
| 5,426,360 A | 6/1995 | Maraio et al. | | |
| 5,490,655 A * | 2/1996 | Bates | ............................ | 248/329 |
| 5,520,505 A | 5/1996 | Weisbrich | | |
| 5,917,454 A | 6/1999 | Hill et al. | | |
| 5,934,499 A * | 8/1999 | van der Hoven | .............. | 220/475 |
| 6,328,270 B1 * | 12/2001 | Elberbaum | .............. | 248/288.31 |
| 6,950,567 B2 | 9/2005 | Kline | | |
| 7,156,359 B2 * | 1/2007 | Dittmer et al. | ................ | 248/551 |
| 7,171,100 B2 * | 1/2007 | Solheid et al. | ................ | 385/135 |
| 7,578,493 B2 * | 8/2009 | Lovell | ............. | 248/551 |
| 7,922,139 B2 * | 4/2011 | Dittmer et al. | ................ | 248/325 |
| 2002/0096203 A1 | 7/2002 | Cohen et al. | | |
| 2002/0158601 A1 | 10/2002 | Kuo et al. | | |
| 2003/0104780 A1 | 6/2003 | Young | | |
| 2003/0234335 A1 * | 12/2003 | Umberg | ......................... | 248/551 |
| 2004/0211872 A1 * | 10/2004 | Dittmer et al. | ................ | 248/323 |
| 2005/0146119 A1 | 7/2005 | Ford et al. | | |
| 2005/0236546 A1 * | 10/2005 | O'Neill | ......................... | 248/317 |
| 2006/0284046 A1 * | 12/2006 | Umberg | ......................... | 248/551 |
| 2007/0034764 A1 * | 2/2007 | Dittmer et al. | ................ | 248/324 |

* cited by examiner

*Primary Examiner* — Nkeisha Smith
(74) *Attorney, Agent, or Firm* — Keith L. Jenkins, Registered Patent Attorney, LLC; Keith L. Jenkins

(57) ABSTRACT

A pole-mountable electronic chassis for mounting on an equipment support pole, including at least one enclosure for electronic circuitry and at least one passage completely through the enclosure sized, shaped, and arranged for receiving the pole. A passage web surrounds the passage and may optionally provide thermal conductivity or circuit support functions. A coupling is provided for fixing the enclosure in place. The coupling may be a low-profile coupling. The enclosure may be sized and shaped to also fit in industry-standard electronics racks.

17 Claims, 7 Drawing Sheets

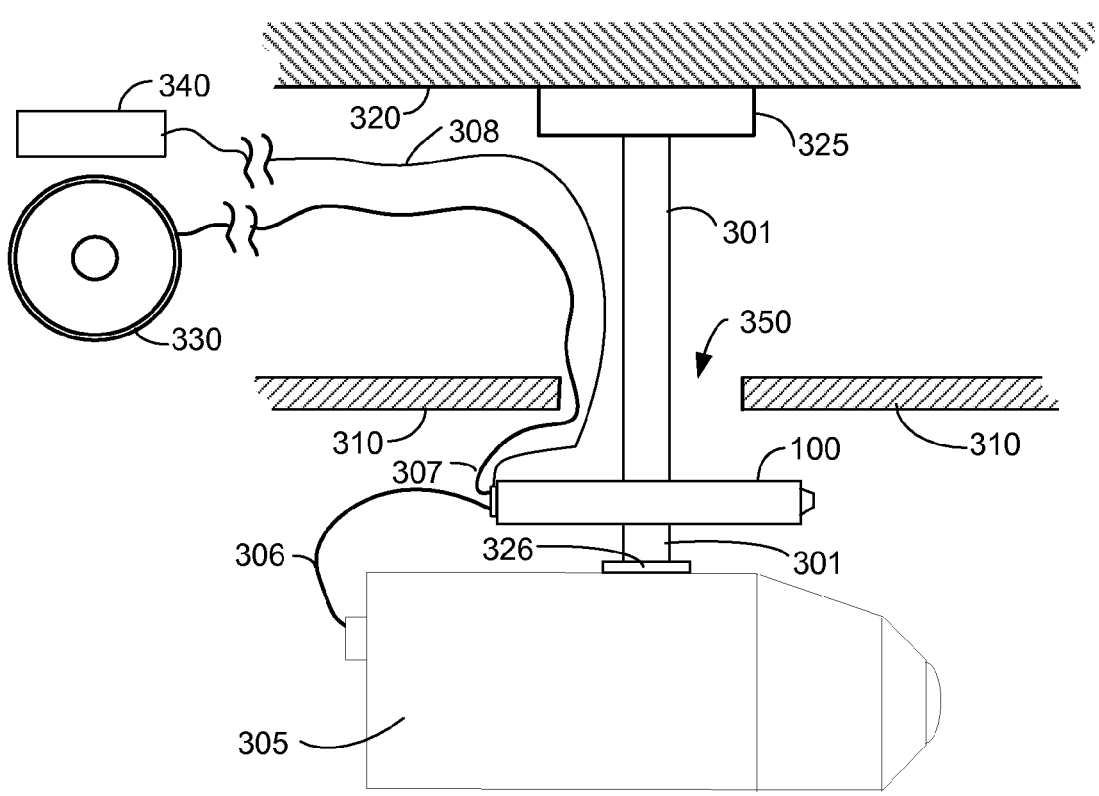
FIG. 4A
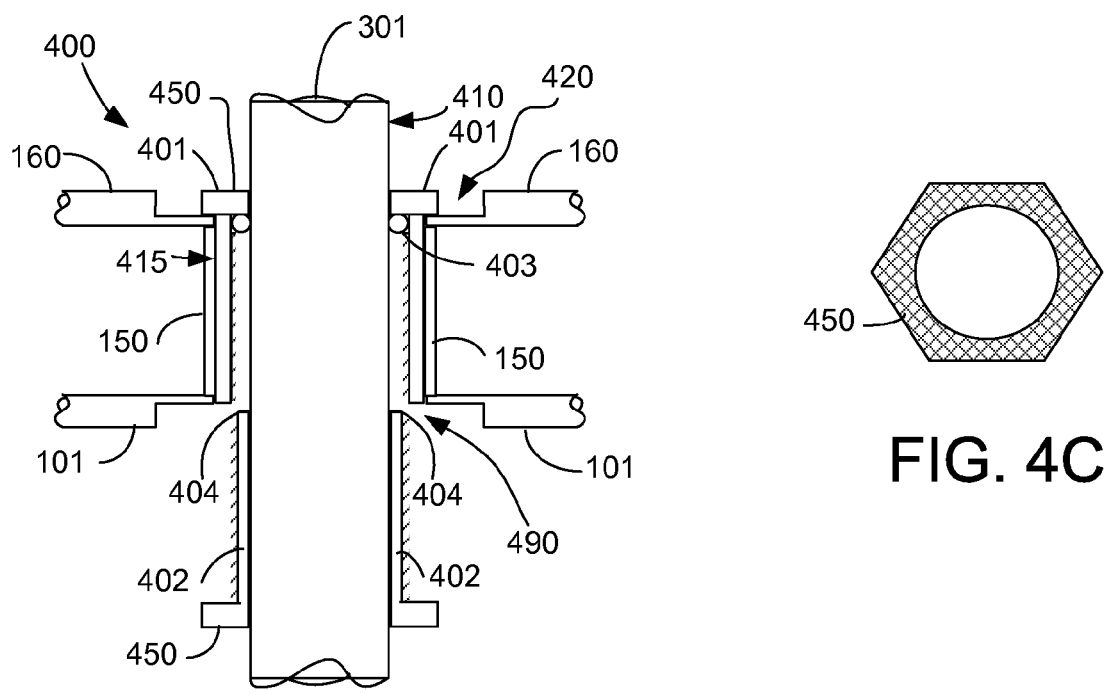
FIG. 4B
FIG. 4C

POLE-MOUNTED ELECTRONICS CHASSIS

RELATED APPLICATIONS

This application claims the benefit of U.S. Provisional Application No. 60/804,436 filed Jun. 10, 2006 entitled POLE-MOUNTABLE ELECTRONIC CHASSIS.

FIELD OF THE INVENTION

The present invention relates to an electronic chassis that is mountable on an appliance-mounting pole that extends through the chassis. The present invention further relates to the use of the pole-mountable electronic chassis in connection with conventionally pole-mounted electronic devices.

BACKGROUND OF THE INVENTION

Electronic modules with electronic circuitry enclosed in a chassis, also called a "housing" or "enclosure", have been commercially available for many years. Electronic modules are conventionally mounted in racks which enable easy installation and removal, as well as ease of interconnecting various modules all mounted in the same rack. Industry standards have been developed for dimensions and other requirements for racks and rack-mountable electronic modules. Some electronic modules have been devised for mounting to the sides of utility poles using brackets.

In order to save floor space, some electronic appliances, such as video projectors, are suspended from ceilings. One method for suspending an electronic appliance from a ceiling is by an appliance-mounting pole having a bracket for attaching one end of the appliance-mounting pole to the ceiling and another bracket for attaching the other end of the appliance-mounting pole to the electronic appliance.

It is sometimes desirable to augment electronic appliances with additional electronic modules. For example, a video projector receiving its audio signal from a laptop computer may not produce the quality and volume of sound output desired. In such a case, an amplifier that improves both volume and quality might be added. Such additions are typically custom installations that are expensive and time consuming. Custom electronic modules have few alternative uses. Also, positioning the amplifier can be problematic. If the amplifier is too accessible, it can be easily stolen. If it is not accessible enough, it can be difficult to service or monitor.

Hence, there is a need for an electronic chassis that mounts to an appliance-mounting pole by means not easily undone by a thief. There is a need to be able to observe indicator lights on the chassis and to have access to various points in the circuitry for installation and test. There is also a need for a coupling for securing the electronic chassis in a spatial relationship to the appliance-mounting pole and the electronic appliance. There is a further need for the electronic chassis to be mountable in alternative ways, such as rack-mountable. The present invention addresses these needs.

BRIEF SUMMARY OF THE INVENTION

One embodiment of the present invention provides a pole-mountable electronic chassis having a hole through the chassis through which the appliance-mounting pole may be routed. The hole through the chassis comprises aligned holes in the top and bottom panels of the chassis as well as a passage web aligned between the aligned holes. Circuit boards for the electronics inside the chassis may have adaptive shapes, sizes or arrangements to accommodate the hole. The chassis may further include a coupling for creating a constant spatial relationship to the appliance-mounting pole and/or the electronic appliance. A particular low-profile coupling is disclosed. Pole-mountable electronic chassis adapted to appliance-mounting poles of various cross-sectional shapes, sizes, and relative angles are comprehended as being within the present invention.

BRIEF DESCRIPTION OF THE DRAWINGS

The above and other objects and advantages of the present invention will become more apparent from the following description taken in conjunction with the following drawings in which:

FIG. 4A is a side diagrammatic view illustrating another exemplary embodiment of the pole-mountable electronic chassis in a low-profile installation;

FIG. 4B is a side sectional view illustrating an exemplary embodiment of a coupling for the pole-mountable electronic chassis of FIG. 4A;

FIG. 4C is a top plan view illustrating one portion of the two-part coupling of FIG. 4B;

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1A:
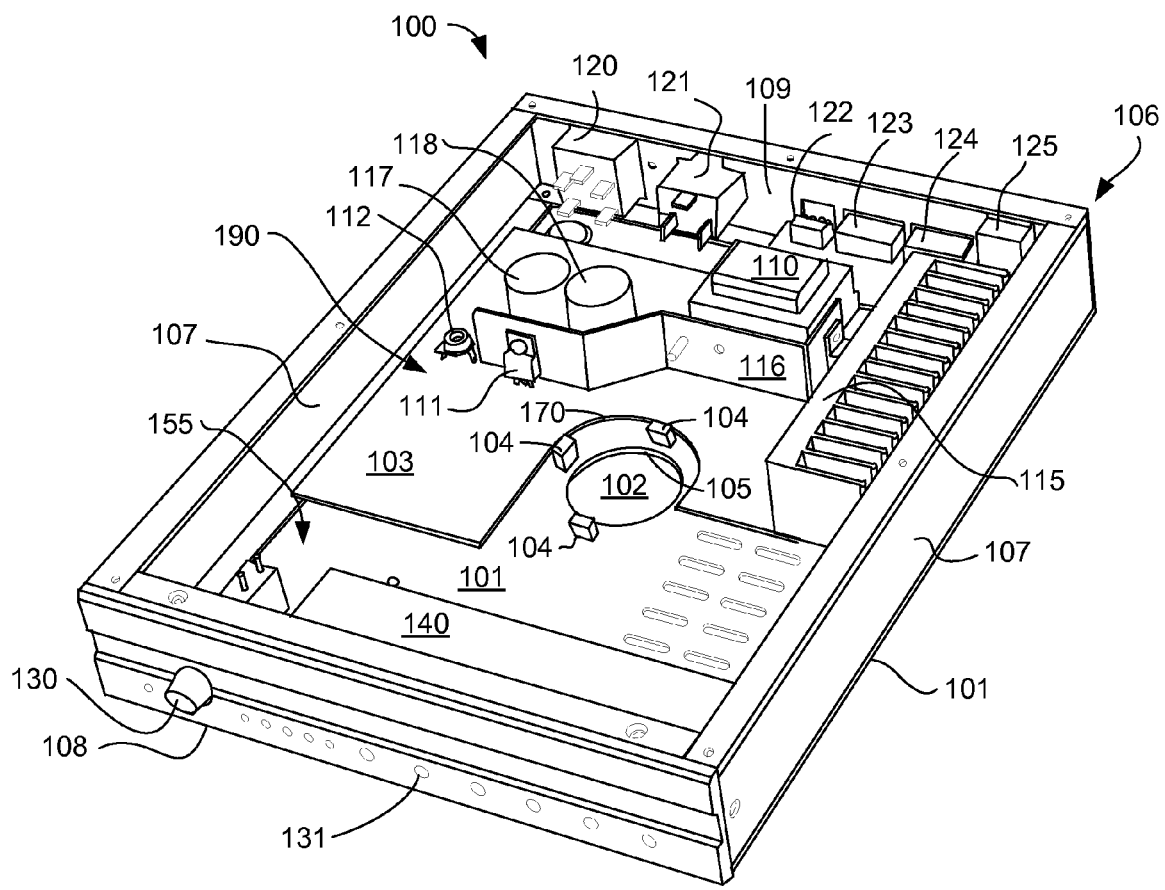
FIG. 1A is a top perspective view illustrating an exemplary embodiment of a pole-mountable electronic chassis with the top web removed and further illustrating an exemplary interior supporting electronic circuitry.

FIG. 1A is a top perspective view illustrating an exemplary embodiment of a pole-mountable electronic chassis 100 with the top web 160 (see FIG. 1C) removed and further illustrating an exemplary interior supporting electronic circuitry 190. The pole-mountable electronic chassis 100 has at least one first web, or bottom web 101, shown as a flat panel forming the bottom of the pole-mountable electronic chassis 100. Bottom web 101 assists in enclosing electronic circuitry 190.

Figure 3:
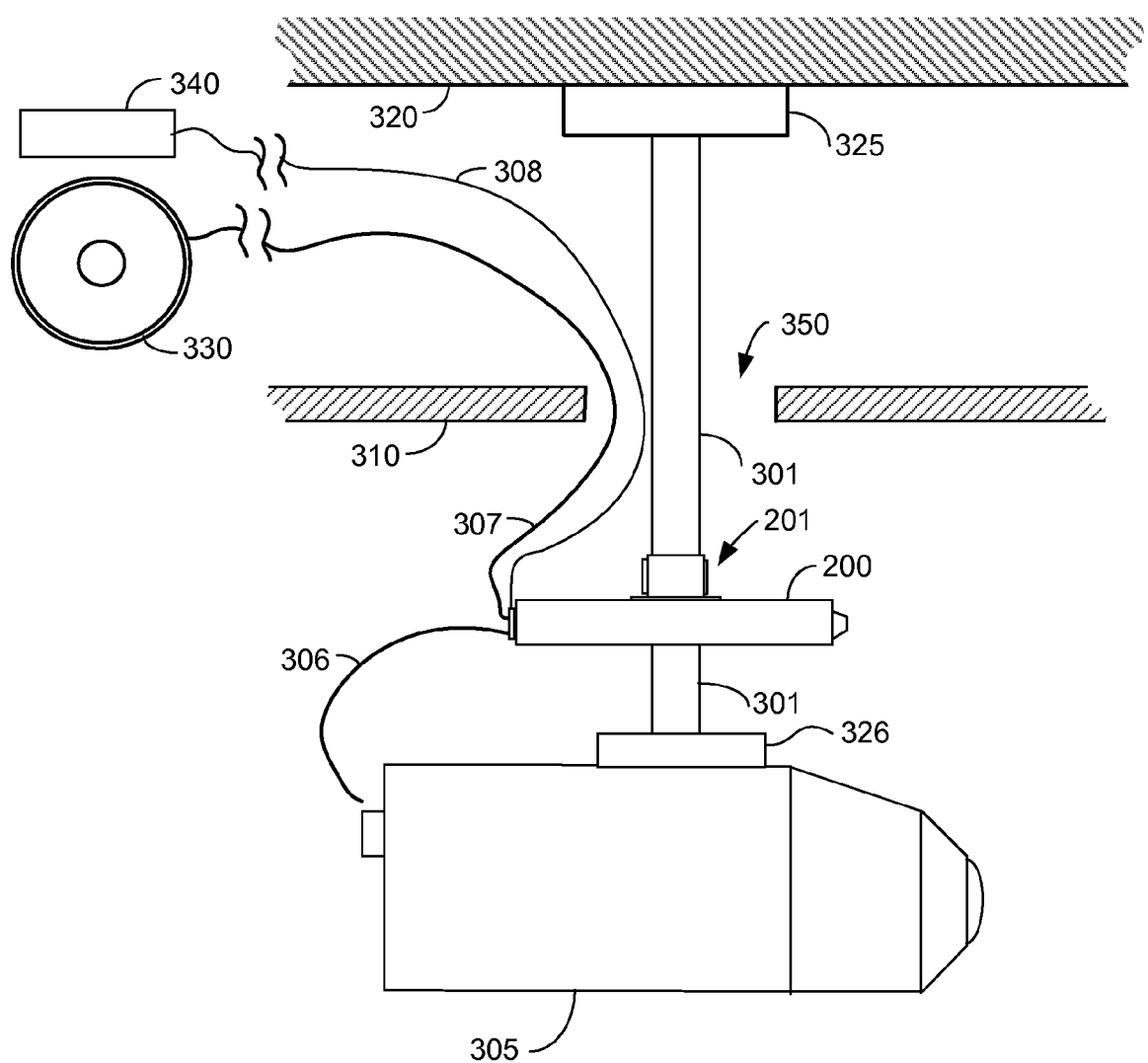
FIG. 3 is a side elevation diagrammatic view illustrating an exemplary embodiment of the pole-mountable electronic chassis of FIGS. 2A and 2B installed.

First opening 102 in the bottom web 101 is sized, shaped, and arranged to receive appliance-mounting pole 301 (see FIG. 3). First opening 102 has an inner surface 105. The size and shape of first opening 102 is preferably adapted to the cross-sectional size and shape of the pole 301. Bottom web 101 is supported near its perimeter by a frame 106 having two side panels 107, a rear panel 108, and a front panel 109. Side panels 107 provide structural integrity for the pole-mountable electronic chassis 100. The external dimensions of the pole-mountable electronic chassis 100 are preferably determined by industry standards for rack-mountable electronics modules.

The pole-mountable electronic chassis 100 supports electronic circuitry 190 within the pole-mountable electronic chassis 100. Rear panel 108 supports a fuse holder 130 and vent holes 131. Front panel 109 supports and provides human access to a switch 120, a power outlet 121, a DIP switch 122, two LED arrays 123 and 124, and audio jack 125. Topographical variations 104 of the top surface 155 of bottom web 101 around first opening 102, illustrated as bosses 104, may be used to assist in holding passage web 150 (see FIG. 1B) in place. Topographical variations 104 may be created by any conventional means. For example, and without limitation, stamping, welding, countersinking, affixing screws, rivets, rings, or inserting posts in holes adapted to the purpose, etc.

Bottom web 101 supports a first circuit board 103 that is sized, shaped, and arranged to not obstruct the first opening 102. A shaped portion 170 of the circuit board 103 partially circumscribes the first opening 102. The first circuit board 103 supports electronic components such as a transformer 110, transistor 111, capacitors 117 and 118, and a coil 112. First circuit board 103 also supports heat sink 115 and shield 116. Second circuit board 140 is also sized and arranged to avoid obstructing opening 102. Second circuit board 140 may be linked to the fuse holder. While the wiring and details of the circuit board are not shown, the electronic circuitry 190 illustrated is for an audio amplifier. Those of skill in the art, when informed by this disclosure, will appreciate the wide variety of electronic modules that can be created in pole-mountable electronic chassis 100.

Figure 1B:
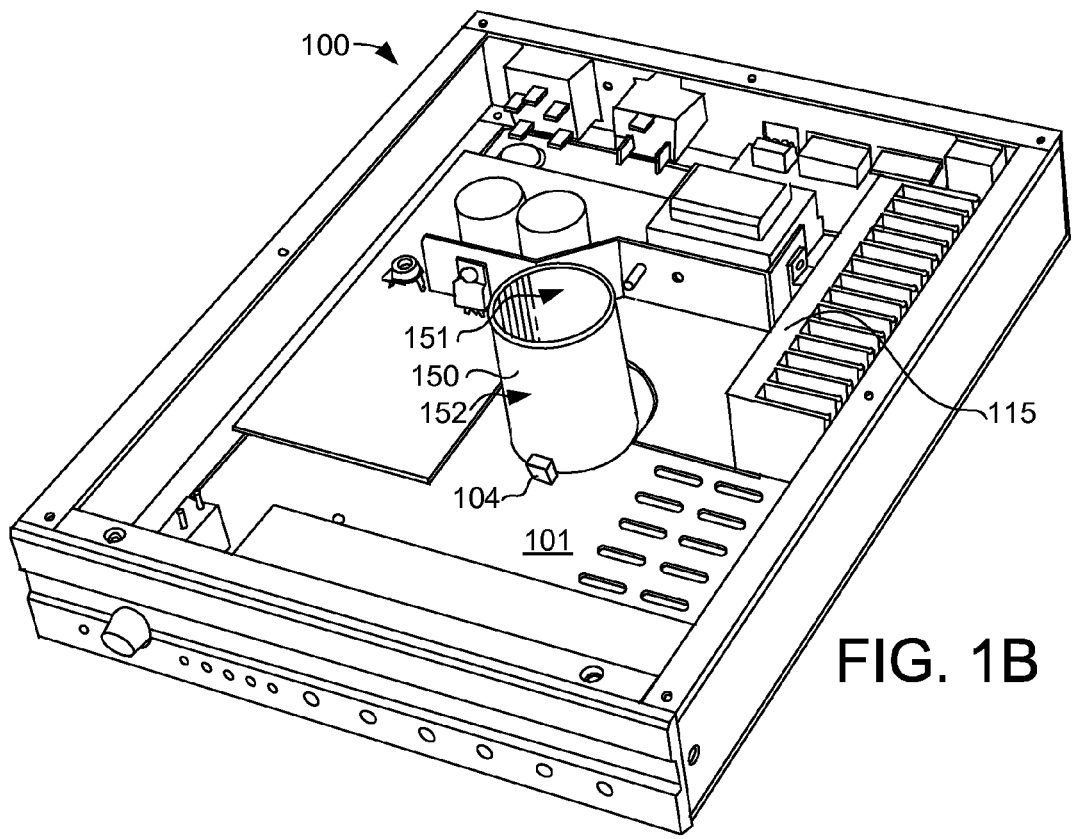
FIG. 1B is the top perspective view illustrating the exemplary embodiment of the pole-mountable electronic chassis of FIG. 1A and further illustrating the addition of a passage web surrounding a passage through said chassis.

FIG. 1B is the top perspective view illustrating the exemplary embodiment of the pole-mountable electronic chassis 100 of FIG. 1A and further illustrating the addition of a passage web 150 surrounding a passage through said pole-mountable electronic chassis 100. Passage web 150 is preferably cylindrical and is placed in alignment with first opening 102. The size and cross-sectional shape of the inner surface 151 of passage web 150 are preferably designed to slidingly engage the external surface 410 of appliance mounting pole 301 (see FIG. 4). Accordingly, the cross-sectional shape of inner surface 151 of passage web 150 may be any shape that is adapted to a mounting appliance mounting pole and the first opening 102. For example, and without limitation, the cross sectional shape of opening 102 and inner surface 151 may be circular, elliptical, polygonal, or of arbitrary shape. In a particular embodiment adapted to a conical appliance-mounting pole, opening 102 and passage web 150 may be frustro-conical. In the embodiment of FIG. 1B, the outer surface 152 of passage web 150 is illustrated as a smooth right circular cylinder, but any shape, independent of the cross-sectional shape of the inner surface 151, may be used. In a particular alternate embodiment, topographical variations 104 may be replaced by holes in bottom web 101 and the outer surface 152 of passage web 150 may have extensions sized, shaped, and arranged to engage such holes.

Considerable variation in the design of passage web 150 is anticipated within this disclosure. For example, passage web 150 may be made of a material with high thermal conductivity, and may be further shaped and arranged to dissipate heat from flanges extending radially inward from the interior surface 151 to engage the appliance-mounting pole 301 (see FIG. 3). While passage web 150 is illustrated as entire, passage web 150 may be, in alternate embodiments, less than entire. While passage web 150 is illustrated as abutting bottom web 101 near the perimeter of opening 102, passage web 150 may be, in alternate embodiments, fixed by outside surface 151 to the inside surface 105 (See FIG. 1A) of a first opening 102 that is sized larger than the size of mounting appliance-mounting pole 301 (See FIG. 3). Passage web 150 preferably creates a barrier to the intrusion of fingers into the circuitry 190 through first opening 102 or second opening 162 while the chassis 100 is not mounted.

Figure 1C:
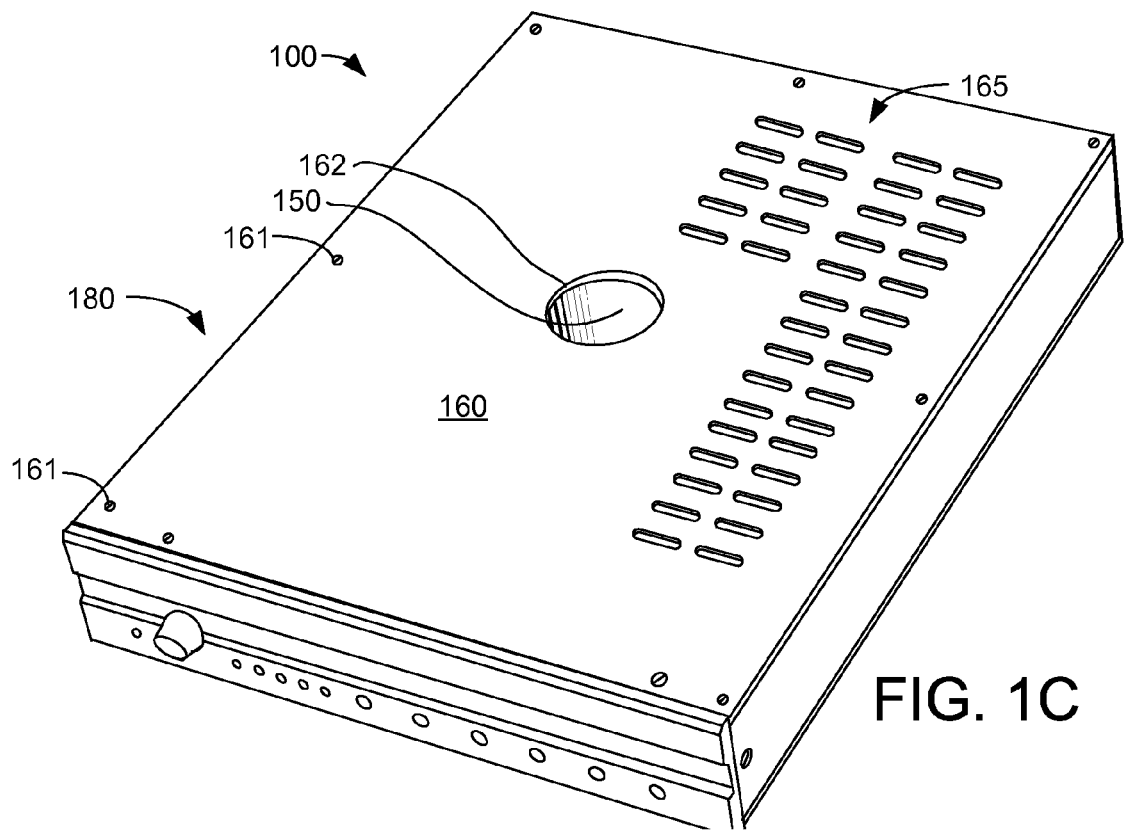
FIG. 1C is the top perspective view illustrating the exemplary embodiment of the pole-mountable electronic chassis of FIG. 1A and FIG. 1B showing the top web in place.

FIG. 1C is the top perspective view illustrating the exemplary embodiment of the pole-mountable electronic chassis 100 of FIG. 1A and FIG. 1B showing the addition of a second web, or top web, 160. Top web 160 is releasably coupled to frame 106 by couplings 161, illustrated as screws. Second opening 162 in top web 160 aligns with first opening 102 in bottom web 101 and with passage web 150, as shown. The underside of top web 160 may have topographical variations, similar to topographical variations 104 on the bottom web 101, for aligning passage web 150. Some features of top web 160, such as ventilation openings 165, may optionally be present. With the top web 160 in place, the bottom web 101 and the frame 106 form an enclosure 180 for electronic circuitry 190. While the exemplary embodiment is described as having a top web 160 and a bottom web 101, the invention can be used with appliance-mounting poles 301 that extend horizontally, making the top and bottom webs into left side and right side webs. Generically, bottom web 101 and top web 160 may be referred to as first web 101 and second web 160, respectively.

Figure 2A:
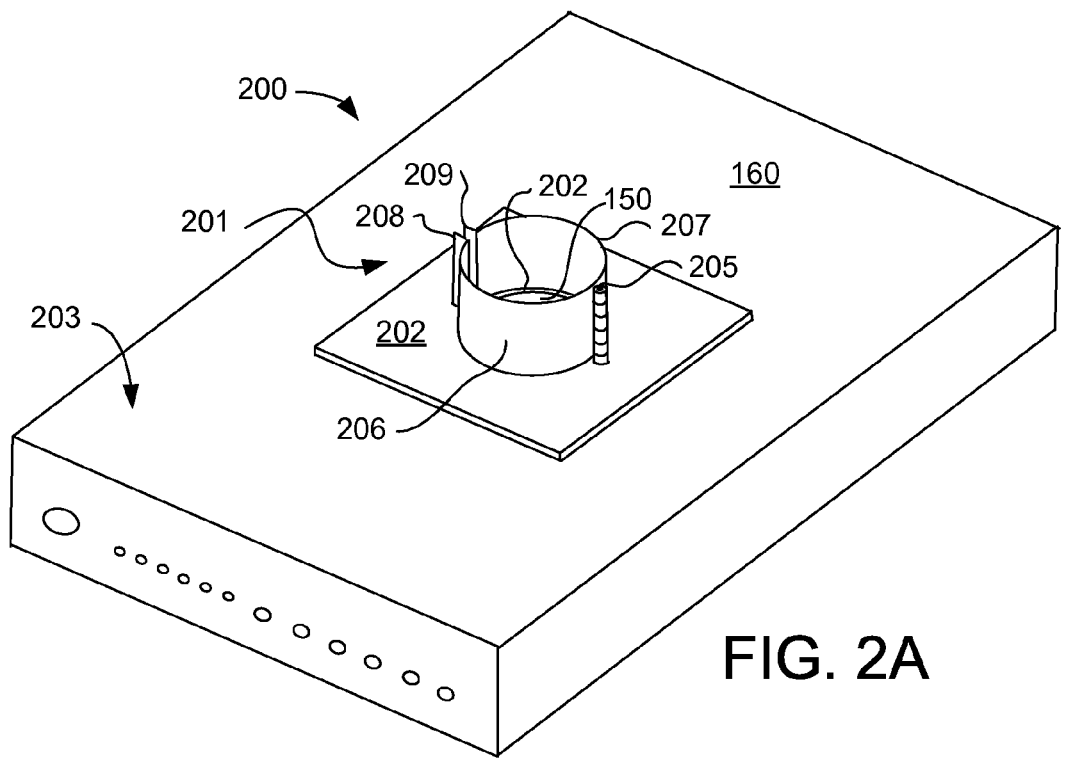
FIG. 2A is a top perspective view illustrating an exemplary embodiment of a pole-mountable electronic chassis further illustrating a coupling.

FIG. 2A is a top perspective view illustrating an exemplary embodiment of a pole-mountable electronic chassis 200 including a releasable coupling 201, which is illustrated as a clamp. Coupling 201 is for releasably coupling pole-mountable electronic chassis 200 to either appliance-mounting pole 301 (See FIG. 3) or some other environmental surface to maintain a positional relationship between the appliance-mounting pole 301 and the pole-mountable electronic chassis 200. While coupling 201 is illustrated as being coupled to the top web 160, it could alternatively or additionally be positioned on the bottom web 101. Likewise, in some alternate embodiments, coupling 201 may connect to the ceiling 320 (see FIG. 3) or to a component otherwise linked to appliance-mounting pole 301. Coupling 201 has a support 202, illustrated as a plate, affixed to top web 160, preferably on the exterior surface 203. Support 202 supports hinge pin 205, which is preferably aligned parallel to the longitudinal axis of passage web 150. Hinge pin 205 engages portions of coupling webs 206 and 207 to constrain rotation of coupling webs 206 and 207 about the hinge pin 205. Coupling webs 206 and 207 have meeting portions 208 and 209, which are configured to be releasably fastened together when the coupling webs 206 and 207 frictionally engage appliance-mounting pole 301. For example, meeting portions 208 and 209 may be shaped and arranged to meet in opposed positions and may have one or more aligned bolt holes to permit fastening with nuts and bolts. For another example, meeting portion 208 may have a first portion of a lock mechanism and meeting portion 209 may have a complimentary second portion of the lock mechanism, which parts engage when moved into proximity. Those of skill in the art, enlightened by this disclosure, will appreciate the various devices that may perform the function of coupling 201 for coupling pole-mounted electronic chassis 200 in a fixed spatial relationship to the mounting appliance-mounting pole 301. For example and without limitation, various clamps, pins through transverse holes or into indentations in the appliance-mounting pole 301 (including locks), shims of various shapes, adhesives, magnetic fasteners, feet extending to a housing located lower on the appliance-mounting pole, hangers extending from the above, or lock washers on a threaded appliance-mounting pole 301 may be used as coupling 201.

Figure 2B:
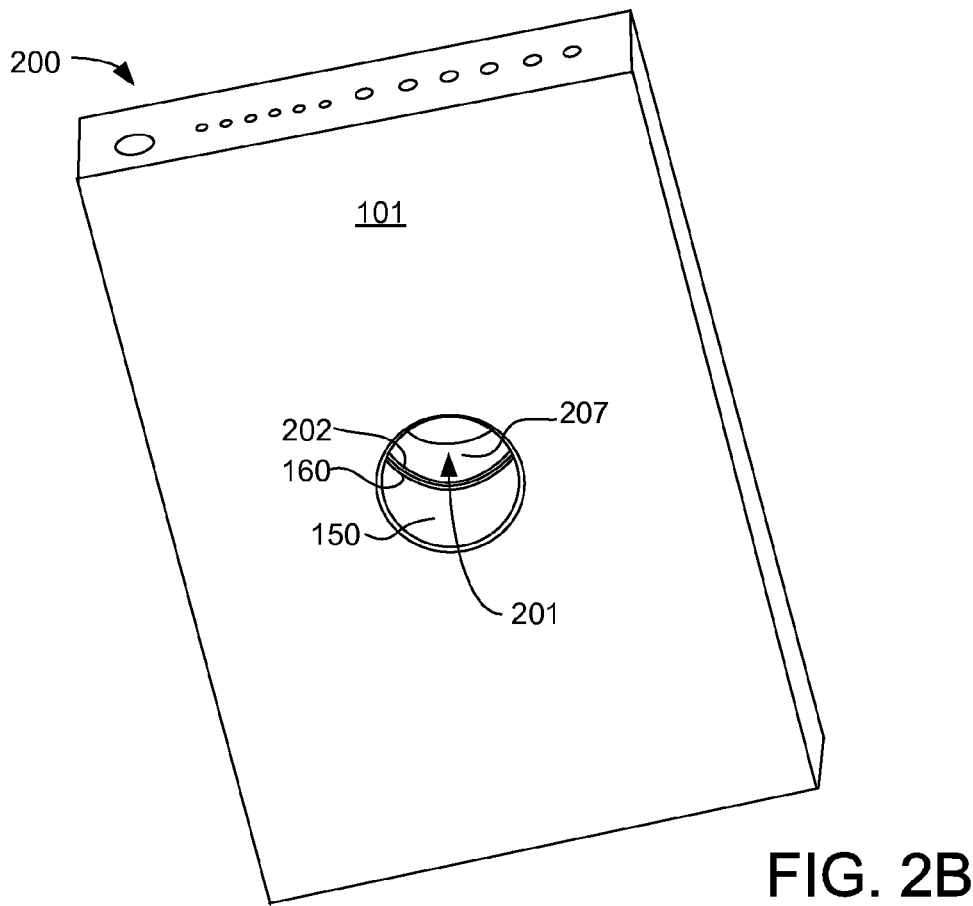
FIG. 2B is a bottom perspective view illustrating an exemplary embodiment of the pole-mountable electronic chassis of FIG. 2A.

FIG. 2B is a bottom perspective view illustrating the exemplary embodiment of the pole-mountable electronic chassis 200 of FIG. 2A. FIG. 2B illustrates the alignment of the bottom web 101, passage web 150, and coupling 201. While the alignment illustrated is for right circular cylinders, other alignments, adapted to appliance-mounting poles 301 having other cross sectional shapes, are within the scope of this disclosure. For example, in a particular embodiment, an oblique circular cylindrical web may substitute for passage web 150, and the coupling and the first and second openings 102 and 162 may be shaped and adapted to align with the oblique circular cylinder. For further example, in a particular embodiment, the appliance-mounting pole may be square in cross-section, and passage web 150 may likewise be square in cross section and the coupling and the first and second openings 102 and 162 may be shaped and adapted to align with passage web 150. Any cross-sectional shape for appliance-mounting pole 301 may be adapted to in the size, shape, and alignment of first opening 102, passage web 150, second opening 162, and coupling 201.

FIG. 3 is a side elevation diagrammatic view illustrating the exemplary embodiment of the pole-mountable electronic chassis 200 of FIGS. 2A and 2B installed on appliance-mounting pole 301. Appliance mounting pole 301 is conventionally a pipe, but may be solid in particular installations. It is the external surface configuration of the appliance-mounting pole 301 that is primarily relevant to this invention. Electronic appliance 305, illustrated as a video projector, is suspended from ceiling 320 by appliance-mounting pole 301, which is connected to the ceiling 320 by bracket 325 and to electronic appliance 305 by bracket 326. Appliance-mounting pole 301 extends through opening 350 in suspended ceiling panel 310 to couple to electronic appliance 305 using bracket 326. Pole-mountable electronic chassis 200 is impaled by appliance-mounting pole 301 through first and second openings 102 and 162 and through passage web 150, and is secured to appliance-mounting pole 301 with coupling 201. In the illustrated embodiment, audio signal conductors 306 conduct an audio signal from the electronic appliance 305 into pole-mountable electronic chassis 200 to be amplified by circuitry 190 (see FIG. 1A). Speaker signal conductors 307 conduct the amplified audio, or speaker signal, to one or more speakers 330. Power for the circuitry inside pole-mountable electronic chassis 200 may be supplied from power source 340 over conductors 308. In an alternate embodiment, power for the pole-mountable electronic chassis 200 may be tapped from electronic appliance 305.

A video projector is just one example of the types of electronic appliances 305 that may be pole mounted, and so may make use of auxiliary circuits, such as amplifiers, in a pole-mountable chassis 200. Those of skill in the art, when informed by this disclosure, will appreciate the wide range of electronic appliances 305 and circuitry 190 that may be used together. While the illustration is to a appliance-mounting pole 301 that suspends electronic appliance 305 from a ceiling 320, this disclosure includes pole-mountable electronic chassis 200 adapted to be mounted on appliance-mounting poles 301 extending from walls, floors, vehicles, and various other environmental surfaces, both synthetic and natural. In an alternate embodiment, the pole-mountable electronic chassis 200 may be mounted on an appliance-mounting pole 301 other than the appliance-mounting pole 301 used for mounting the electronic appliance 305. In some embodiments, pole-mountable electronic chassis 200 may be weather-proofed for outdoor use.

FIG. 4A is a side elevation diagrammatic view illustrating another exemplary embodiment of the pole-mountable electronic chassis 100 in a low-profile installation. Pole-mountable electronic chassis 100 has a releasable low-profile coupling 400, illustrated in FIG. 4B and FIG. 4C to minimize its vertical dimension. The pole-mountable electronic chassis 100 is placed closer to opening 350 in ceiling panel 310 for cosmetic purposes. Openings 350 are often roughly cut by installers and are unsightly.

FIG. 4B is a side sectional view illustrating an exemplary embodiment of a releasable low-profile coupling 400 for the pole-mountable electronic chassis 100 of FIG. 4A. Low-profile coupling 400 includes a compressor 490 having two parts with complementary threads and dimensions: internally threaded sleeve 401 and externally threaded sleeve 402. Internally threaded sleeve 401 has a head portion, illustrated in FIG. 4C as a hexagonal bolt head 450. Bottom web 101 and top web 160 may have a counter sunk portion 420 surrounding first opening 102 and second opening 162, respectively. Counter sunk portion 420 accepts the head 450 of internally threaded sleeve 401 to minimize the vertical dimension of pole-mountable electronic chassis 100, as installed. Threaded sleeve 401 retains O-ring 403, which is a resilient compressible member. When externally threaded sleeve 402 is threaded into internally threaded sleeve 401, the O-ring is compressed by end 404 of externally threaded sleeve 402. The compressed O-ring 403 frictionally engages the external surface 410 of appliance-mounting pole 301 to secure the pole-mountable electronic chassis 100 to the appliance-mounting pole 301. The external surface 415 of internally threaded sleeve 401 preferably slidingly engages the inner surface 151 of passage web 150, as shown. The internal surface of externally-threaded sleeve 402 preferably slidingly engages the external surface 410 of appliance-mounting pole 301, as shown. In some alternate embodiments, various resilient compressible members may be used in lieu of an O-ring 403. In an alternate embodiment, passage web 150 is omitted as a separate part and internally-threaded sleeve 401 performs the function of passage web 150.

FIG. 4C is a top plan view illustrating one portion of the two-part releasable low-profile coupling 400 of FIG. 4B. While the illustration is to a hexagonal head 450, any shape that is adapted to being torqued, by hand or tool, will serve the purpose.

Figure 5:
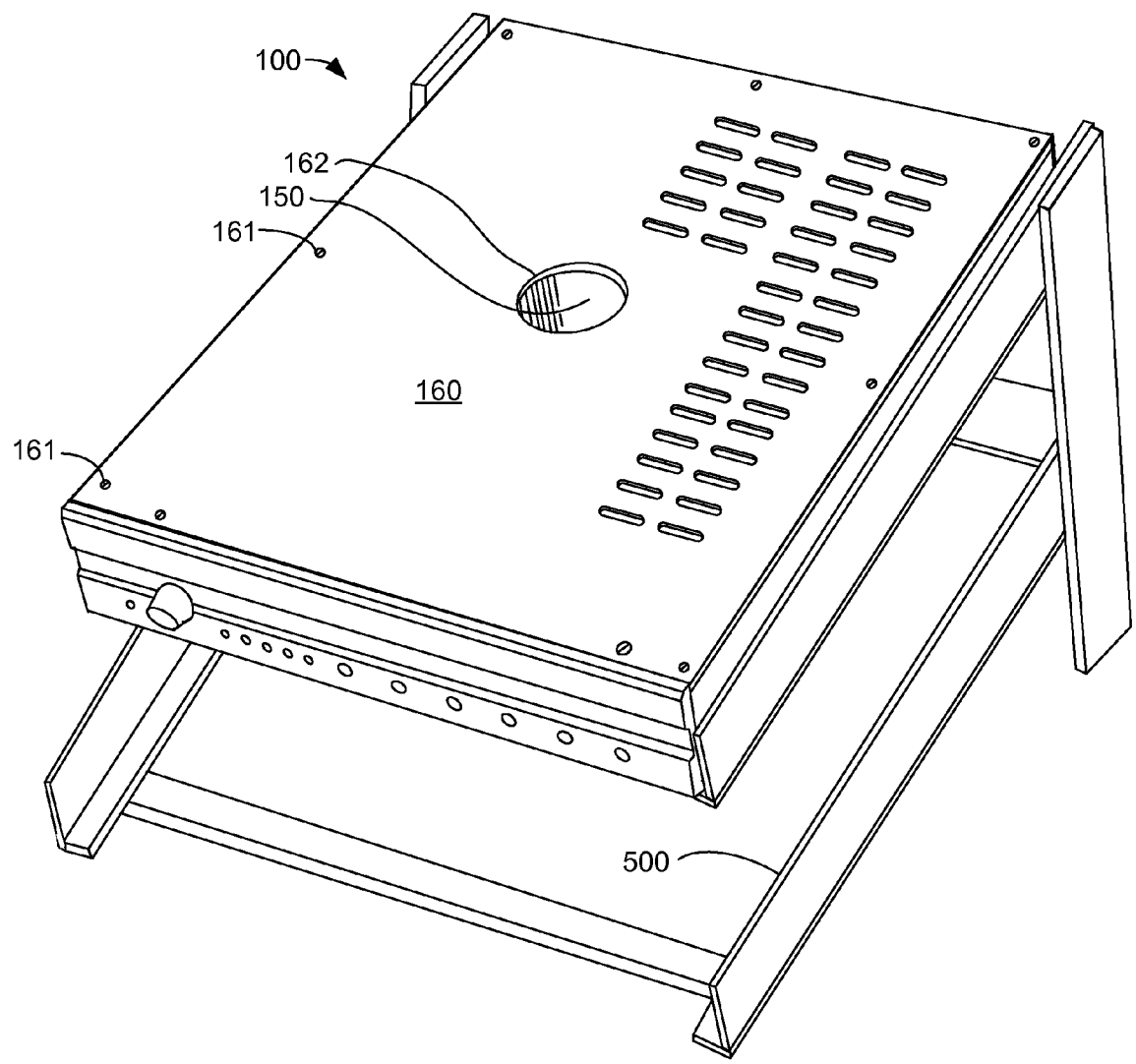
FIG. 5 is a perspective view illustrating the exemplary embodiment of the pole-mountable electronic chassis of FIG. 1C installed in an electronics rack.

FIG. 5 is a perspective view illustrating the exemplary embodiment of the pole-mountable electronic chassis 100 of FIG. 1C installed in an electronics rack 500. By making the pole-mountable electronic chassis 100 also rack-mountable, one production line serves two purposes. Electronics racks 500 come in a wide variety of designs and the present invention comprehends various pole-mountable electronic chassis 100 adapted to the various electronic rack 500 designs.

Figure 6:
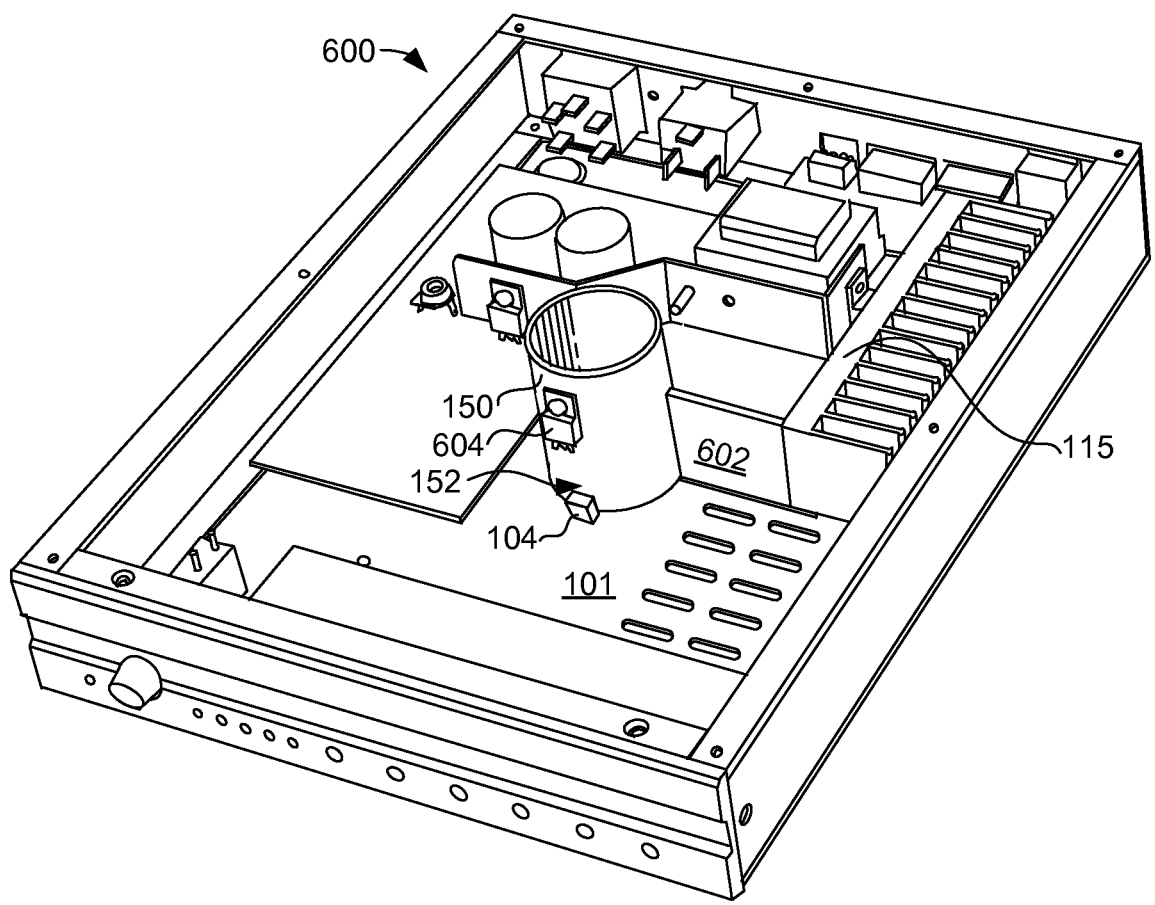
FIG. 6 is a top perspective view illustrating the exemplary embodiment of a pole-mountable electronic chassis, similar to that of FIG. 1B, and further illustrating an exemplary passage web supporting electronic circuitry and a thermal connector.

FIG. 6 is a top perspective view illustrating the exemplary embodiment of a pole-mountable electronic chassis 600, similar to that of FIG. 1B, and further illustrating an exemplary passage web 150 supporting electronic circuitry 604 and a thermal connector 602. Thermal connector 602 provides a thermal conductive path between the heat sink 115 and the passage web 150. In alternate embodiments, the outer surface of a thermally conductive passage web 150 may be sized, shaped, and arranged to engage heat sink 115, i.e., thermal connector 602 may be integral to passage web 150. In an alternate embodiment, electronic components, such as electronic component 604, may be supported on the outer surface 152.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. For example, pole-mountable electronic chassis 100 may be supported by legs extending from the bottom of pole-mountable electronic chassis 100 to the top of electronic appliance 305. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A pole-mountable electronic chassis comprising:
  a. at least one first web;
  b. at least one first opening in said at least one first web, wherein said at least one opening is sized, shaped, and arranged for receiving a pole, and
  c. wherein said electronic chassis is sized, shaped, and arranged to be rack-mountable in an industry-standard electronics rack and to be pole-mountable on a branchless portion of a pole;
  d. at least one frame comprising at least first and second generally flat opposing rectangular side panels releasably attachable to said at least one first web, wherein said at least one frame comprises a rack-mountable frame sized, shaped, and arranged to be mountable in an industry-standard electronics rack;
  e. at least one second web, spaced apart from said at least one first web by said at least one frame, wherein said at least one second web is one of attachable and attached to said at least one frame;
  f. at least one second opening in said at least one second web, said at least one second opening sized, shaped, and arranged to receive the pole; and
  g. wherein said at least one second opening is alignable with said at least one first opening.

2. The pole-mounted electronic chassis of claim 1, wherein said at least one frame comprises said first and second generally flat opposing rectangular side panels and opposing front and rear rectangular panels, releasably attachable to said at least one first web, wherein said frame comprises a rack-mountable frame sized, shaped, and arranged to be mountable in an industry-standard electronics rack.

3. The pole-mounted electronic chassis of claim 1, further comprising at least one passage web surrounding at least one passage between said at least one first opening and at least one second opening, wherein said passage web is operable to support at least one electronic component on an outer surface of said at least one passage web.

4. The pole-mounted electronic chassis of claim 1, further comprising at least one releasable coupling for releasably coupling said at least one first web in a constant spatial relationship to the pole.

5. The pole-mounted electronic chassis of claim 4, wherein said at least one releasable coupling comprises at least one low-profile coupling.

6. A pole-mountable electronic chassis for mounting on an appliance-mounting pole, comprising:
  a. at least one enclosure enclosing electronic circuitry;
  b. at least one passage completely through said at least one enclosure, wherein said at least one passage is sized, shaped, and arranged for receiving such appliance-mounting pole; and
  c. at least one passage web surrounding said at least one passage, wherein said passage web is operable to support at least one electronic component on an outer surface of said at least one passage web;
  d. wherein said electronic chassis is sized, shaped, and arranged to be rack-mountable in an industry-standard electronics rack and to be pole-mountable on an appliance-mounting pole, wherein the appliance-mounting pole comprises a pole that has a branchless portion;
  e. wherein said enclosure comprises first and second generally flat opposing rectangular side panels.

7. The pole-mountable electronic chassis of claim 6, wherein said at least one passage web is coupled at least one of thermally and structurally to at least a portion of said electronic circuitry.

8. The pole-mountable electronic chassis of claim 6, further comprising at least one releasable coupling operable to releasably couple said at least one enclosure in a constant spatial relationship to the appliance-mounting pole.

9. The pole-mountable electronic chassis of claim 8, wherein said at least one releasable coupling comprises at least one low-profile coupling.

10. A pole-mountable electronic chassis for mounting on an appliance-mounting pole comprising:
  a. at least one first web comprising at least one first opening sized, shaped, and arranged to receive the appliance-mounting pole;
  b. at least one second web comprising at least one second opening sized, shaped, and arranged to receive the appliance-mounting pole;
  c. wherein at least a portion of said at least one second web is spaced apart from at least one portion of said at least one first web;
  d. wherein said at least one second opening is aligned to said at least one first opening, defining at least one passage between said first and second openings;
  e. first and second generally flat opposing rectangular side panels attached to said at least one first web and to said at least one second web;
  f. wherein said electronic chassis is sized, shaped, and arranged to be rack-mountable in an industry-standard electronics rack and to be pole-mountable on an appliance-mounting pole, wherein the appliance-mounting pole comprises a branchless portion of a pole; and
  g. wherein at least one of said at least one first web and said at least one second web comprises at least one topographical variation configured to abut at least one passage web and to assist in holding said at least one passage web between said at least one first opening and said at least one second opening, wherein said passage web surrounds said at least one first opening and said at least one second opening and said passage web surrounds said passage between said at least one first opening and at least one second opening; and
  h. further comprising electronic circuitry located between said at least one portion of said at least one first web and said at least a portion of said at least one second web, wherein at least a portion of said electronic circuitry is supported on said passage web.

11. The pole-mountable electronic chassis of claim 10, wherein said electronic circuitry comprises at least one circuit board sized, shaped, and arranged to avoid interference with at least one portion of said at least one first opening, wherein said at least one circuit board is thermally coupled to a heat sink and said heat sink is thermally connected to said passage web.

12. The pole-mountable electronic chassis of claim 10, wherein said at least one first web and said at least one second web comprise portions of a rack-mountable electronic chassis having a rectangular front panel that is one of attached and attachable between said first and second generally flat opposing rectangular sides.

13. The pole-mountable electronic chassis of claim 10, wherein an outside surface of said passage web supports at least a portion of at least one electronic circuit.

14. The pole-mountable electronic chassis of claim 10, wherein at least one of said at least one first web and said at least one second web comprises a plurality of topographical variations configured to abut at least one passage web and to assist in holding said at least one passage web between said at least one first opening and said at least one second opening.

15. The pole-mountable electronic chassis of claim 10, further comprising at least one releasable coupling operable to releasably couple at least one of said at least one first web and said at least one second web in constant spatial relationship to said at least one appliance-mounting pole.

16. The pole-mountable electronic chassis of claim 15, wherein said at least one releasable coupling is a low-profile coupling.

17. The pole-mountable electronic chassis of claim 15, wherein said at least one releasable coupling comprises:
 a. at least one resilient compressible member sized and arranged to engage the appliance-mounting pole when compressed; and
 b. at least one compressor operable to compress said at least one resilient compressible member.

\* \* \* \* \*